US010550724B2

(12) United States Patent
Moniz et al.

(10) Patent No.: US 10,550,724 B2
(45) Date of Patent: Feb. 4, 2020

(54) SYSTEM AND METHOD FOR THE PRESSURIZATION OF A SUMP OF A GAS TURBINE ENGINE

(71) Applicant: General Electric Company, Schenectady, NY (US)

(72) Inventors: Thomas Ory Moniz, Loveland, OH (US); Daniel Robert Dwyer, West Chester, OH (US); Mark John Laricchiuta, West Chester, OH (US); Jeffrey Donald Clements, Mason, OH (US); Brandon Wayne Miller, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 462 days.

(21) Appl. No.: 15/290,132

(22) Filed: Oct. 11, 2016

(65) Prior Publication Data

US 2018/0100410 A1   Apr. 12, 2018

(51) Int. Cl.
*F01D 25/20*   (2006.01)
*F01D 25/18*   (2006.01)
(Continued)

(52) U.S. Cl.
CPC .............. *F01D 25/20* (2013.01); *F01D 11/02* (2013.01); *F01D 11/04* (2013.01); *F01D 25/18* (2013.01);
(Continued)

(58) Field of Classification Search
CPC .......... F01D 11/02; F01D 11/04; F01D 25/18; F01D 25/183; F01D 25/20;
(Continued)

(56) References Cited

U.S. PATENT DOCUMENTS 3,347,553 A * 10/1967 Schweiger .............. F01D 11/04
                                                       184/6.11
3,528,241 A *  9/1970 Gill, Jr. ..................... F02C 7/06
                                                       60/39.08
(Continued)

FOREIGN PATENT DOCUMENTS

CN         105143610 A      12/2015

OTHER PUBLICATIONS

Chinese Office Action Corresponding to CN Application No. 2017109460112 dated Feb. 1, 2019.

*Primary Examiner* — Steven M Sutherland
*Assistant Examiner* — Thuyhang N Nguyen
(74) *Attorney, Agent, or Firm* — Dority & Manning, P.A.

(57) ABSTRACT

A gas turbine engine includes a fan section and a core turbine engine operable with the fan section. The gas turbine engine also includes a sump pressurization assembly including a valve, a first duct in airflow communication with the valve and a first pressurized air source, and a second duct in airflow communication with the valve and a second pressurized air source. Further, the sump pressurization assembly includes a supply duct selectively in airflow communication with the first duct and the second duct through the valve. The supply duct is located at least partially inward of a core air flowpath of the core turbine engine for pressurizing a sump of the gas turbine engine.

16 Claims, 3 Drawing Sheets

(51) Int. Cl.
  *F01D 11/02*  (2006.01)
  *F01D 11/04*  (2006.01)
  *F02C 6/06*  (2006.01)
  *F02C 7/06*  (2006.01)
  *F02C 3/04*  (2006.01)

(52) U.S. Cl.
  CPC .............. *F01D 25/183* (2013.01); *F02C 6/06* (2013.01); *F02C 7/06* (2013.01); *F02C 3/04* (2013.01)

(58) Field of Classification Search
  CPC .... F05D 2240/20; F05D 2260/98; F02C 6/04; F02C 6/06; F02C 6/08
  See application file for complete search history.

(56) References Cited

U.S. PATENT DOCUMENTS

| | | | |
|---|---|---|---|
| 4,497,172 A | 2/1985 | Smith | |
| 5,611,661 A | 3/1997 | Jenkinson | |
| 7,584,619 B2 | 9/2009 | Granitz et al. | |
| 7,765,788 B2 | 8/2010 | Schwarz | |
| 7,836,675 B2 | 11/2010 | Corattiyil et al. | |
| 8,915,057 B2 | 12/2014 | Corattiyil et al. | |
| 8,978,351 B2 | 3/2015 | Suciu et al. | |
| 10,082,041 B2 | 9/2018 | Bei et al. | |
| 2006/0042227 A1 | 3/2006 | Coffinberry | |
| 2013/0039739 A1* | 2/2013 | Milne | F01D 11/06 415/13 |
| 2016/0326878 A1* | 11/2016 | Morimoto | F01D 5/081 |
| 2016/0333743 A1* | 11/2016 | Yamazaki | F01D 25/32 |

\* cited by examiner

SYSTEM AND METHOD FOR THE PRESSURIZATION OF A SUMP OF A GAS TURBINE ENGINE

FIELD OF THE INVENTION

The present subject matter relates generally to a gas turbine engine, or more particularly to a sump pressurization assembly for a gas turbine engine.

BACKGROUND OF THE INVENTION

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Within the core of the gas turbine engine, one or more bearings are provided for supporting various rotary components of the gas turbine engine. Typically, these bearings are oil lubricated bearings, such that a lubrication oil supply assembly provides lubrication oil thereto during operation of the gas turbine engine. For these configurations, the core of the gas turbine engine includes one or more sumps enclosing the one or more bearings, to contain lubrication oil provided thereto. In order to better contain such lubrication oil within the sumps, certain gas turbine engines provide pressurized air to void regions around the various sumps. The pressurized air may be bled from within the compressor section. However, compressed air from this region may be relatively valuable from an efficiency standpoint of the gas turbine engine.

Accordingly, a sump pressurization assembly for a gas turbine engine able to provide pressurized air to void regions surrounding one or more sumps of the gas turbine engine while overcoming the above difficulties would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a gas turbine engine is provided, the gas turbine engine defining an axial direction and a radial direction. The gas turbine engine includes a fan section having a fan, and a core turbine engine operable with the fan section for driving the fan. The core turbine engine defines a core air flowpath, and at least one of the fan section or the core turbine engine defines a sump. The gas turbine engine further includes a sump pressurization assembly. The sump pressurization assembly includes a valve, a first duct in airflow communication with the valve and a first pressurized air source, and a second duct in airflow communication with the valve and a second pressurized air source. The sump pressurization assembly further includes a supply duct selectively in airflow communication with the first duct and the second duct through the valve, the supply duct located at least partially inward of the core air flowpath along the radial direction to pressurize the sump.

In an exemplary aspect of the present disclosure, a method for operating a sump pressurization assembly of a gas turbine engine is provided. The method includes positioning a valve of the sump pressurization assembly in a first position to provide a supply duct with pressurized air from a first duct. The first duct is in airflow communication with a first pressurized air source. The supply duct provides the pressurized air to a location within the gas turbine engine to pressurize a sump of the gas turbine engine. The method also includes positioning the valve of the sump pressurization assembly in a second position to provide the supply duct with pressurized air from a second duct, the second duct in airflow communication with a second pressurized air source. The supply duct provides the pressurized air to a location within the gas turbine engine to pressurize the sump of the gas turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a gas turbine engine, with forward referring to a position closer to an engine inlet and aft referring to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 1:
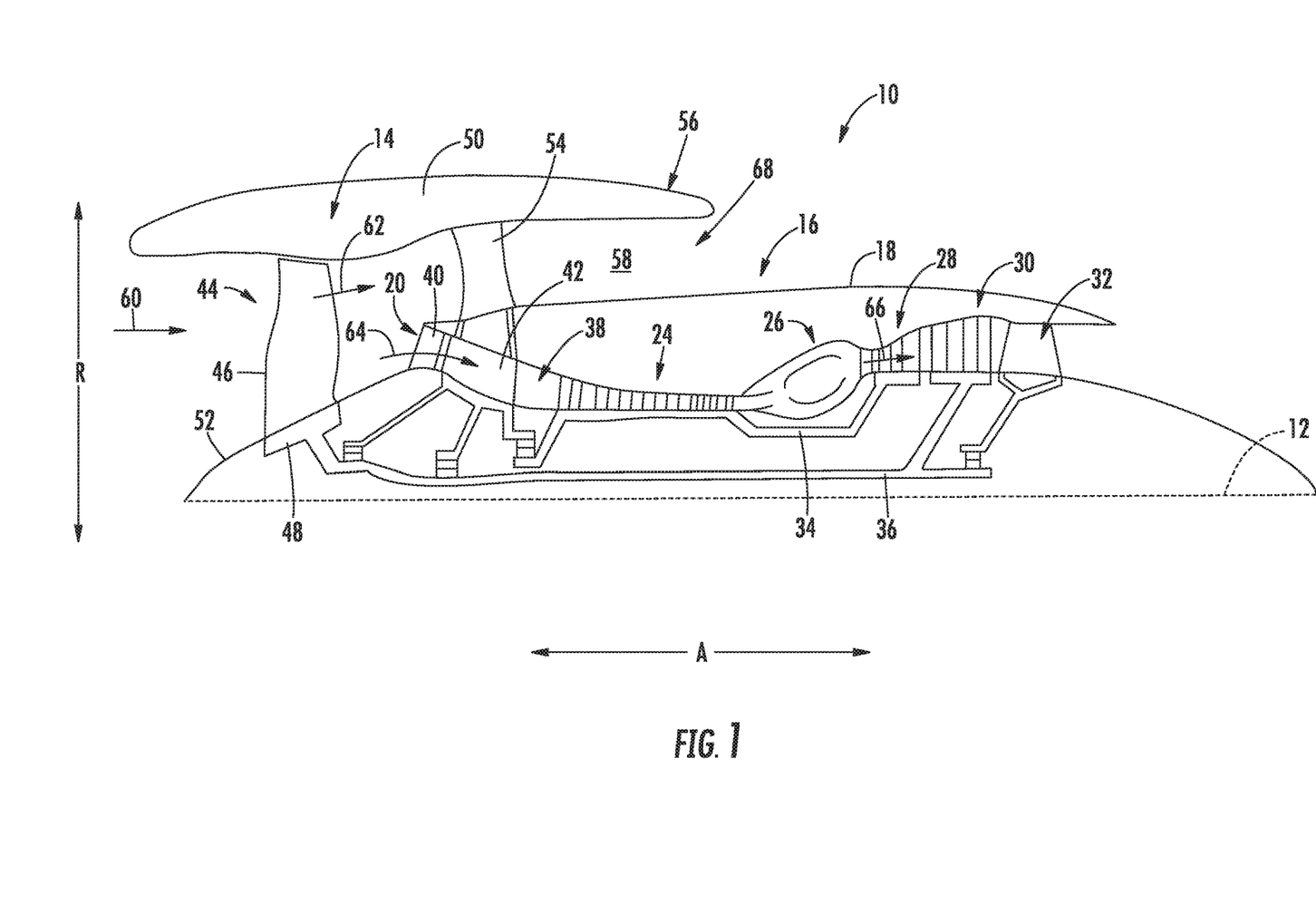
FIG. 1 is a schematic, cross-sectional view of an exemplary gas turbine engine according to various embodiments of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan 44 jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a single compressor, which may be referred to as a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the fan section 14.

The compressor section, combustion section 26, turbine section, and jet exhaust nozzle section 32 together define a core air flowpath 38 through the core turbine engine 16. Notably, for the embodiment depicted, the core turbine engine 16 further includes a stage of inlet guide vanes 40 at a forward end of the core air flowpath 38, as well as a plurality of struts 42 extending through the core air flowpath 38 at a location forward of the HP compressor 24. The plurality of struts 42 may provide structural support for the core turbine engine 16.

For the embodiment depicted, the fan section 14 includes a fixed-pitch fan 44 having a plurality of fan blades 46 coupled to a disk 48 in a spaced apart manner. More specifically, for the embodiment depicted, the fan 44 is a single stage fan, i.e., a fan having a single stage of fan blades 46. As depicted, the fan blades 46 extend outwardly from the disk 48 generally along the radial direction R. The fan blades 46 and disk 48 are together rotatable about the longitudinal axis 12 by LP shaft 36. For the embodiment depicted, the LP shaft 36 extends to, and couples to, the fan 44.

Referring still to the exemplary embodiment of FIG. 1, the disk 48 is covered by rotatable front hub 52 aerodynamically contoured to promote an airflow through the plurality of fan blades 46. Additionally, the exemplary fan section 14 includes an annular fan casing or outer nacelle 50 that circumferentially surrounds the fan 44 and/or at least a portion of the core turbine engine 16. The exemplary nacelle 50 depicted is supported relative to the core turbine engine 16 by a plurality of circumferentially-spaced outlet guide vanes 54. Moreover, a downstream section 56 of the nacelle 50 extends over an outer portion of the core turbine engine 16 so as to define a bypass airflow passage 58 therebetween.

During operation of the turbofan engine 10, a volume of air 60 enters the turbofan 10 through the nacelle 50 and/or fan section 14. As the volume of air 60 passes across the fan blades 46, a first portion of the air 60, as indicated by arrows 62, is directed or routed into the bypass airflow passage 58 and a second portion of the air 60, as indicated by arrow 64, is directed or routed into the core air flowpath 38, and more specifically, into the inlet 20 defined by the core turbine engine 16 to the core air flowpath 38. The ratio between the first portion of air 62 and the second portion of air 64 is commonly known as a bypass ratio. The pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes that are coupled to the outer casing 18 and HP turbine rotor blades that are coupled to the HP shaft or spool 34 (not labeled), thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes that are coupled to the outer casing 18 and LP turbine rotor blades that are coupled to the LP shaft 36 or spool 36 (not labeled), thus causing the LP shaft 36 or spool 36 to rotate, thereby supporting operation of the fan 44.

The combustion gases 66 are subsequently routed through the jet exhaust nozzle section 32 of the core turbine engine 16 to provide propulsive thrust. Simultaneously, a pressure of the first portion of air 62 is substantially increased as the first portion of air 62 is routed through the bypass airflow passage 56 before it is exhausted from a fan nozzle exhaust section 68 of the turbofan 10, also providing propulsive thrust.

Further, for the embodiment depicted, the turbofan engine 10 is configured as a supersonic turbofan engine 10 configured to operate at flight speeds greater than Mach 1. Such may be accomplished due to the various design parameters of the turbofan engine 10, such as the single-stage fan 44 and booster-less compressor section (i.e., the compressor section including a single, HP compressor 24). Additionally, other design parameters, such as a fan pressure ratio, a bypass ratio, a fan diameter, an overall pressure ratio, etc., have been considered.

It should be appreciated, however, that the exemplary turbofan engine 10 depicted in FIG. 1 is by way of example only, and that in other exemplary embodiments, the turbofan engine 10 may have any other suitable configuration. For example, in other embodiments, the fan 44 may include more than the single-stage of fan blades depicted, the fan 44 may be configured as a variable pitch fan, the turbofan engine 10 may include a reduction gearbox/power gearbox mechanically coupling the LP shaft 36 to the fan section 14, and the core turbine engine 16 may include any suitable number of compressors and/or turbines. Moreover, in still other exemplary embodiments, aspects of the present disclosure may further be utilized with any other suitable gas turbine engine, such as a turboprop engine, turbojet engine, turboshaft engine, etc.

Figure 2:
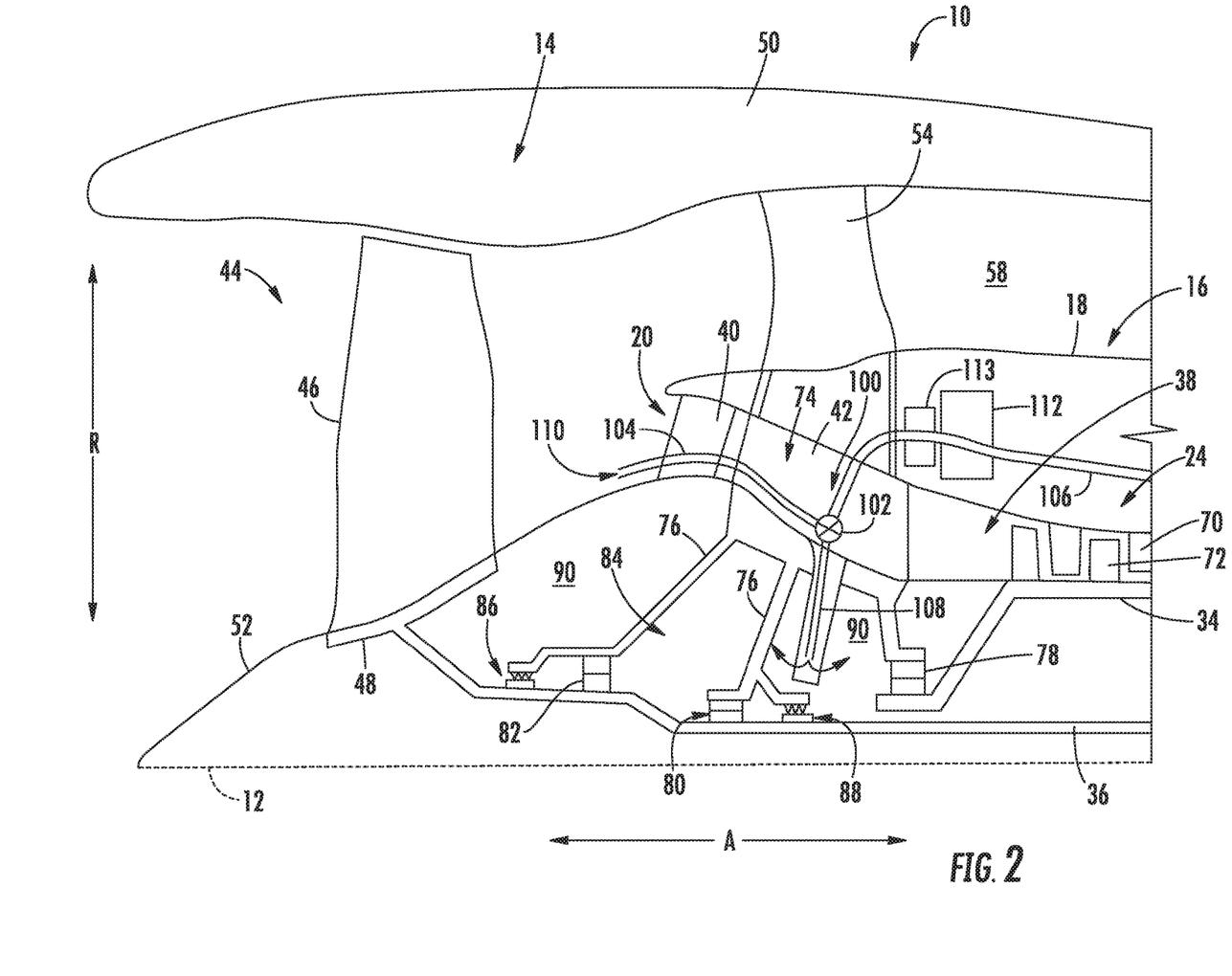
FIG. 2 is a schematic, cross-sectional view of a compressor section and fan section of a gas turbine engine in accordance with an exemplary embodiment of the present disclosure.

Referring now to FIG. 2, a close-up, schematic view is provided of a portion of the compressor section and fan section 14 of the exemplary turbofan engine 10 of FIG. 1. Similar to the HP turbine 28 and LP turbine 30, the HP compressor 24 includes a plurality of stationary HP compressor stator vanes 70 coupled to the outer casing 18 and a plurality of rotatable HP compressor rotor blades 72 coupled to the HP shaft 34 for compressing an airflow provided through the inlet 20 of the core air flowpath 38 from the fan 44 of the fan section 14.

Moreover, as is depicted, rotation of the HP shaft 34 is supported at least in part through a forward frame 74 of the core turbine engine 16. The forward frame 74 provides support to a forward end of the turbofan engine 10, as well as to the HP shaft 34 and the LP shaft 36 (depicted extending coaxially with the HP shaft 34 to the fan 44). Specifically, the forward frame 74 is attached to the struts 42 extending through the core air flowpath 38, which are, in turn, attached to the outlet guide vanes 54. Additionally, the forward frame 74 includes a plurality of inner frame members 76 located inside of the core air flowpath 38 along the radial direction R. It should be appreciated, however, that in other exemplary embodiments, the forward frame 74 may have any other suitable configuration.

More specifically, for the embodiment depicted, the forward frame 74 supports certain rotary components of the turbofan engine 10, e.g., the HP shaft 34 and the LP shaft 36, through one or more bearing assemblies. For example, the turbofan engine 10 depicted includes a first bearing 78 supporting a forward end of the HP shaft 34, a second bearing 80 supporting a forward end of the LP shaft 36, and a third bearing 82 supporting a portion of LP shaft 36 extending to the fan 44. The first, second, and third bearings 78, 80, 82 may be configured in any suitable manner for supporting the various rotary components of the turbofan engine 10. For example, one or more of the first, second, and third bearings 78, 80, 82 may be configured as roller bearings, ball bearings, gas bearings, etc. Moreover, it should be appreciated, that the exemplary bearing configuration depicted is also provided by way of example only, and that in other exemplary embodiments, the turbofan engine 10 may have any other suitable bearing configuration, and may utilize any other suitable type or form of bearing.

Referring still to the exemplary embodiment of FIG. 2, each of the first, second, and third bearings 78, 80, 82 are configured as oil lubricated bearings. Accordingly, during operation of the turbofan engine 10, a lubrication oil supply assembly (not shown) may provide one or more of the first, second, and third bearings 78, 80, 82 with lubrication oil in order to lubricate the bearings and/or remove an amount of heat from the bearings. In order to prevent the lubrication oil from reaching undesirable locations within the core turbine engine 16, one or more of the bearings may be positioned within a sump defined by the turbofan engine 10. Specifically, for the embodiment depicted, the core turbine engine 16 includes a forward sump 84 enclosing the second bearing 80 and the third bearing 82. The turbofan engine 10 additionally includes a forward seal 86 to prevent an amount of leakage of lubrication oil from a forward end of the forward sump 84 and an aft seal 88 to prevent an amount of leakage of lubrication oil from an aft end of the forward sump 84. It should be appreciated, that although depicted in isolation, the first bearing 78 may also be positioned within the forward sump 84, or alternatively, the turbofan engine 10 may include another sump enclosing the first bearing 78.

Moreover, the exemplary turbofan engine 10 depicted further includes a sump pressurization assembly 100 configured to pressurize the one or more sumps of the turbofan engine 10. For example, for the embodiment depicted, the sump pressurization assembly 100 is configured to provide a flow of pressurized air to a location within the core turbine engine 16 and increase an air pressure surrounding the one or more sumps of the turbofan engine 10. More specifically, for the embodiment depicted, the core turbine engine 16 defines a plurality of void areas 90 surrounding the one or more sumps (e.g., the forward sump 84), and the sump pressurization assembly 100 is configured to provide a flow of pressurized air to the void areas 90. By increasing an air pressure in these void areas 90, the seals, such as the forward seal 86 and the aft seal 88 of the forward sump 84, may more effectively prevent lubrication oil from leaking therethrough, as a pressure difference across the seal urges an airflow into the sump, as opposed to lubrication oil out of the sump.

For the embodiment depicted, the sump pressurization assembly 100 includes a valve 102, a first duct 104 in airflow communication with the valve 102, a second duct 106 in airflow communication with the valve 102, and a supply duct 108 selectively in airflow communication with the first duct 104 and the second duct 106 through the valve 102. The first duct 104 is further in airflow communication with a first pressurized air source and the second duct 106 is further in airflow communication with a second pressurized air source. Additionally, the supply duct 108 is configured to receive pressurized airflow from one or both of the first duct 104 or second duct 106, and provide such pressurized airflow to an interior of the core turbine engine 16 (i.e., for the embodiment depicted, to the one or more void areas 90) to pressurize the one or more sumps of the turbofan engine 10. Accordingly, the supply duct 108 is located at least partially inward of the core air flowpath 38 along the radial direction R to pressurize the one or more sumps.

Referring still to the embodiment of FIG. 2, the first pressurized air source is the fan 44 of the fan section 14. For example, the exemplary first duct 104 depicted includes an inlet 110. The inlet 110 of the first duct 104 is located aft of the fan 44 and forward of the inlet 20 to the core air flowpath 38. Accordingly, the first duct 104 may be configured to receive an airflow pressurized by the fan 44 during operation of the turbofan engine 10. Notably, for the embodiment depicted, the first duct 104 is depicted as a separate structure extending through the core air flowpath 38 to a location aft of the fan 44 and forward of the inlet 20 of the core air flowpath 38. It should be appreciated, however, that in other embodiments, the first duct 104 may instead extend at a location inward of the core air flowpath 38 along the radial direction R, with the inlet 110 to the first duct 104 being defined through an inner casing aft of the fan 44/core turbine engine 16 and forward of the inlet 20 to the core air flowpath 38. Additionally, with one or more these embodiments, the first duct 104 may not be a separate duct structure, and instead may be integrated into certain components of the core turbine engine 16, which together define a flowpath from the inlet 110 of the first duct 104 to the valve 102. Further, with one or more of these embodiments, the valve 102 may also be located inward of the core air flowpath 38, or within a strut, as depicted.

Additionally, for the embodiment depicted, the second pressurized air source is a location of the core air flowpath 38 downstream of the inlet 20 to the core air flowpath 38. More specifically, for the embodiment depicted the second pressurized air source is the compressor (i.e., the HP compressor 24) of the compressor section of the core turbine engine 16, such that the second duct 106 of the sump pressurization assembly 100 is in airflow communication with the HP compressor 24 of the core turbine engine 16. For example, the second duct 106 of the sump pressurization assembly 100 may be in airflow communication with the HP compressor 24 proximate an aft end of the HP compressor 24, such as with one of the last three (3) or four (4) stages of compressor rotor blades 72 of the HP compressor 24. Alternatively, however, the second duct 106 of the sump pressurization assembly 100 may be in airflow communication with the HP compressor 24 at any other suitable location of the HP compressor 24. Alternatively, still, in other embodiments, the second duct 106 of the sump pressurization assembly 100 may additionally or alternatively be in airflow communication with any other suitable location of the core air flowpath 38.

For the above described embodiment of FIG. 2, it will be appreciated that a temperature of the airflow received from the HP compressor 24 may be relatively elevated. Accordingly, in order to reduce a temperature of the airflow through the second duct 106 of the sump pressurization assembly 100, the sump pressurization assembly 100 further includes a heat exchanger 112 in thermal communication with the second duct 106. The heat exchanger 112 may be, e.g., a bypass air-air heat exchanger, a fuel-air heat exchanger, a lubrication oil-air heat exchanger, or any other suitable heat exchanger. Moreover, for the embodiment depicted, the sump pressurization assembly 100 includes an air filter 113 in airflow communication with the second duct 106 to remove particles from the airflow provided therethrough. It should be appreciated, however, that although the air filter 113 is depicted in airflow communication with the second duct 106, in other exemplary embodiments, the sump pressurization assembly 100 may additionally or alternatively include air filter(s) in airflow communication with the first duct 104 and/or the supply duct 108.

During certain operating conditions of the turbofan engine 10 it may be beneficial to provide the supply duct 108 with air from the first pressurized air source, such as the fan 44, through the first duct 104, while during other operating conditions of the turbofan engine 10 it may be beneficial to provide the supply duct 108 with air from the second pressurized air source, such as the HP compressor 24, through the second duct 106. Accordingly, the valve 102 of the sump pressurization assembly 100 is movable between a first position and a second position. When the valve 102 is in the first position, substantially all of an airflow through the supply duct 108 is received from the first duct 104. By contrast, when the valve 102 is in the second position, substantially all of an airflow through the supply duct 108 is received from the second duct 106. Notably, in other embodiments, the valve 102 may further be movable to a number of intermediate positions between the first position and the second position, allowing any desired ratio of airflow from the first duct 104 and the second duct 106 into the supply duct 108 of the sump pressurization assembly 100.

More particularly, for the embodiment depicted, wherein the first pressurized air source is the fan 44 and the second pressurized air source is the HP compressor 24, it may be beneficial to move the valve 102 to the second position when the gas turbine engine is operating below an engine operating parameter threshold, and further to move the valve 102 to the first position when the gas turbine engine is operating above the engine operating parameter threshold. In certain exemplary embodiments, the engine operating parameter may be a flight speed, or some other parameter indicative of the flight speed, and the threshold may be, e.g., a flight speed below which an airflow immediately downstream of the fan 44 may not define a sufficiently high pressure to satisfactorily pressurize the one or more sumps of the turbofan engine 10. For example, during low flight speed conditions, such as during takeoff and/or idle operating conditions (such as during ground idle speeds) of the turbofan engine 10, it may be beneficial to receive pressurized airflow from the HP compressor 24, as an airflow immediately downstream of the fan 44 may not define a sufficiently high pressure to satisfactorily pressurize the one or more sumps of the turbofan engine 10. Such may be due to the inclusion of a single stage fan 44, without a booster. By contrast, during high flight speed conditions, such as cruise operating conditions or supersonic cruise operating conditions, it may be beneficial to receive pressurized airflow from the fan 44, such that relatively more valuable airflow (i.e., from an efficiency standpoint) from the HP compressor 24 is not used up for sump pressurization purposes.

It should be appreciated, however, that the exemplary sump pressurization assembly 100 may in other embodiments be utilized with any other suitable gas turbine engine, and may further be utilized to pressurize additional sumps of a gas turbine engine not shown or described herein. Moreover, in other exemplary embodiments, the sump pressurization assembly 100 may have any other suitable configuration. For example, in other embodiments, the sump pressurization assembly may include three or more ducts in airflow communication with various pressurized air sources, one or more of the ducts may include a plurality of ducts spaced along the circumferential direction, and/or, the sump pressurization assembly 100 may provide pressurized air to an interior of a sump to pressurize such sump. Further, in still other exemplary embodiments, the gas turbine engine 10 may include an eductor valve system to lower the sump pressure requirements. This eductor valve system can be controlled in conjunction with the sump pressurization system defined above.

Figure 3:
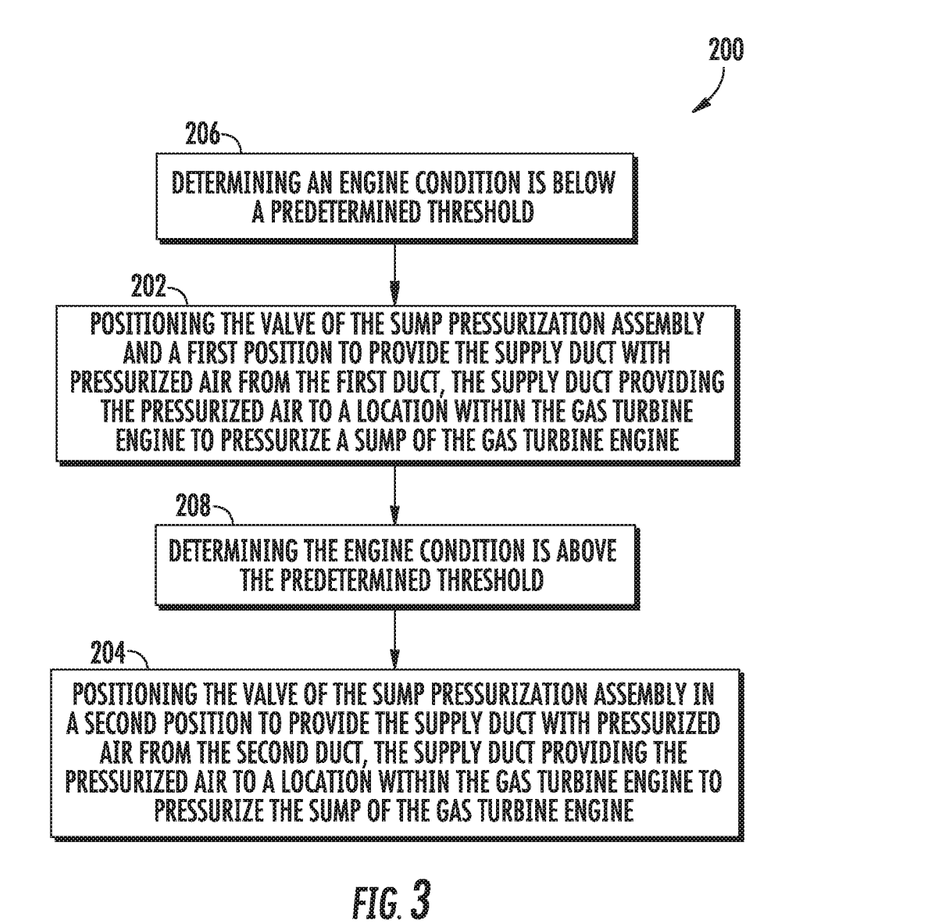
FIG. 3 is a flow diagram of a method for operating a sump pressurization assembly in accordance with an exemplary aspect of the present disclosure.

Referring now to FIG. 3, a flow chart depicting a method (200) for operating a sump pressurization assembly of the gas turbine engine is provided. The method (200) may in certain exemplary aspects be utilized with the exemplary sump pressurization assembly described above with reference to FIGS. 1 and 2. Accordingly, the sump pressurization assembly may generally include a first duct, a second duct, a valve, and a supply duct.

As shown in the exempt a method (200) includes at (202) positioning the valve of the sump pressurization assembly in a first position to provide the supply duct with pressurized air from the first duct, the supply duct providing the pressurized air to a location within the gas turbine engine to pressurize a sump of the gas turbine engine. The first duct is in airflow communication with a first pressurized air source of the gas turbine engine. Additionally, the exemplary method (200) includes at (204) positioning the valve of the sump pressurization assembly in a second position to provide the supply duct with pressurized air from the second duct, the supply duct providing the pressurized air to a location within the gas turbine engine to pressurize the sump of the gas turbine engine. The second duct is similarly in airflow communication with a second pressurized air source. Notably, positioning the valve of the sump pressurization assembly in the second position at (204) may occur subsequent to positioning the valve of the sump pressurization assembly in the first position at (202), or alternatively, may occur prior to positioning the valve of the sump pressurization assembly in the first position at (202).

In certain exemplary aspects, the first pressurized air source is a fan of a fan section of the gas turbine engine, and the second pressurized air source is a compressor of a compressor section of the gas turbine engine. With such an exemplary aspect, the method (200) may move the valve between the first and second positions based on certain engine operating conditions of the gas turbine engine.

For example, referring still to FIG. 3, the exemplary method (200) includes at (206) determining an engine condition is below a predetermined threshold (e.g., operating at flight speeds less than Mach 1). With such an exemplary aspect, positioning the valve of the sump pressurization assembly in the first position at (202) includes positioning the valve of the sump pressurization assembly in the first position in response to determining at (206) the engine condition is below a predetermined threshold.

Further, the exemplary method (200) includes at (208) determining the engine condition is above the predetermined threshold (e.g., operating at flight speeds greater than Mach 1). The determination at (208) may be made prior to the determination at (206), or alternatively, subsequent to the determination at (206). With such an exemplary aspect, positioning the valve of the sump pressurization assembly in the second position at (204) includes positioning the valve of the sump pressurization assembly in the second position in response to determining at (208) the engine condition is above the predetermined threshold.

In at least certain exemplary aspects, the engine condition may correlate to a flight speed. For example, the engine condition may be a flight speed of the gas turbine engine, a rotational speed of the fan, a pressure ratio the fan, a core speed of the gas turbine engine, etc. Additionally, the predetermined threshold of the engine condition may refer to a threshold above which a pressure immediately aft of the fan is expected to be sufficient to satisfactorily pressurize the one or more sumps of the gas turbine engine.

A gas turbine engine utilizing a sump pressurization assembly in accordance with one or more embodiments of the present disclosure and/or operating according to one or more exemplary aspects of the present disclosure may provide for a more efficient gas turbine engine. Specifically, incorporating the sump pressurization assembly disclosed herein may allow for a gas turbine engine to more efficiently use fan air during relatively high flight speed conditions, while using, e.g., compressor air during relatively low flight speed conditions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining an axial direction and a radial direction, the gas turbine engine comprising:
    a fan section comprising a fan;
    a core turbine engine operable with the fan section for driving the fan, the core turbine engine comprising a compressor and defining a core air flowpath, wherein at least one of the fan section or the core turbine engine define a sump; and
    a sump pressurization assembly comprising
        a valve, wherein the valve is movable between a first position and a second position;
        a first duct in airflow communication with the valve and a first pressurized air source, wherein the first pressurized air source is the fan;
        a second duct in airflow communication with the valve and a second pressurized air source, wherein the second pressurized air source is the compressor; and
        a supply duct selectively in airflow communication with the first duct or the second duct through the valve, the supply duct located at least partially inward of the core air flowpath along the radial direction to pressurize the sump, wherein substantially all of an airflow through the supply duct is received from the first duct when the valve is in the first position, and wherein substantially all of the airflow through the supply duct is received from the second duct when the valve is in the second position.

2. The gas turbine engine of claim 1, wherein the first duct of the sump pressurization assembly defines an inlet, and wherein the inlet of the first duct is located aft of the fan.

3. The gas turbine engine of claim 2, wherein the core turbine engine defines an inlet to the core air flowpath, and wherein the inlet of the first duct is located forward of the inlet to the core air flowpath.

4. The gas turbine engine of claim 2, wherein the fan is a single stage fan.

5. The gas turbine engine of claim 1, wherein the sump pressurization assembly further comprises a heat exchanger in thermal communication with the second duct.

6. The gas turbine engine of claim 1, wherein the sump pressurization assembly further comprises an air filter in airflow communication with the second duct.

7. The gas turbine engine of claim 1, wherein the valve is configured to be moved to the second position when the gas turbine engine is operating below an engine parameter threshold, and wherein the valve is configured to be moved to the first position when the gas turbine engine is operating above an engine parameter threshold.

8. The gas turbine engine of claim 1, wherein the gas turbine engine is a supersonic turbofan engine configured to operate at flight speeds greater than Mach 1.

9. The gas turbine engine of claim 1, wherein the fan is a single stage fan, and wherein the compressor of the core turbine engine includes a single compressor.

10. A method for operating a sump pressurization assembly of a gas turbine engine, the gas turbine engine comprising a fan section comprising a fan and a core turbine engine operable with the fan section for driving the fan, wherein the core turbine engine comprises a compressor and defines a core air flowpath, wherein at least one of the fan section or the core turbine engine define a sump, the method comprising:
    positioning a valve of the sump pressurization assembly in a first position to provide a supply duct with pressurized air from a first duct, the first duct in airflow communication with a first pressurized air source, the supply duct providing the pressurized air to a location within the gas turbine engine to pressurize the sump of the gas turbine engine, wherein the first pressurized air source is the fan; and
    positioning the valve of the sump pressurization assembly in a second position to provide the supply duct with pressurized air from a second duct, the second duct in airflow communication with a second pressurized air source, the supply duct providing the pressurized air to a location within the gas turbine engine to pressurize the sump of the gas turbine engine, wherein the second pressurized air source is the compressor, and wherein substantially all of an airflow through the supply duct is received from the first duct when the valve is in the first position and wherein substantially all of the airflow through the supply duct is received from the second duct when the valve is in the second position.

11. The method of claim 10, further comprising:
    determining an engine condition is below a predetermined threshold, wherein positioning the valve of the sump pressurization assembly in the second position comprises positioning the valve of the sump pressurization assembly in the second position in response to determining the engine condition is below the predetermined threshold.

12. The method of claim 10, further comprising:
determining the engine condition is above the predetermined threshold, wherein positioning the valve of the sump pressurization assembly in the first position comprises positioning the valve of the sump pressurization assembly in the first position in response to determining the engine condition is above the predetermined threshold.

13. The method of claim 12, wherein the engine condition correlates to a flight speed.

14. The method of claim 10, wherein the first duct of the sump pressurization assembly defines an inlet, and wherein the inlet of the first duct is located aft of the fan.

15. The method of claim 10, wherein the sump pressurization assembly further comprises a heat exchanger in thermal communication with the second duct.

16. The method of claim 10, further comprising:
operating the gas turbine engine under subsonic flight conditions defining a flight speed less than Mach 1, wherein positioning the valve of the sump pressurization assembly in the second position comprises positioning the valve of the sump pressurization assembly in the second position when operating the gas turbine engine under subsonic flight conditions; and operating the gas turbine engine under supersonic flight conditions defining a flight speed greater than Mach 1, wherein positioning the valve of the sump pressurization assembly in the first position comprises positioning the valve of the sump pressurization assembly in the first position when operating the gas turbine engine under supersonic flight conditions.

* * * * *